United States Patent
Santhanakrishnan et al.

(10) Patent No.: US 9,811,441 B2
(45) Date of Patent: Nov. 7, 2017

(54) METHOD AND SYSTEM FOR DETECTING MEMORY LEAKS IN A PROGRAM

(75) Inventors: Radhika Santhanakrishnan, Karnataka (IN); Venu Gopala Krishna Kishore Anumakonda, Andhra Pradesh (IN); Chintan Vinodray Raval, Gujarat (IN); Tejaswitha Nutikattu, Andhra Pradesh (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/000,193

(22) PCT Filed: Mar. 23, 2011

(86) PCT No.: PCT/IN2011/000194
§ 371 (c)(1),
(2), (4) Date: Apr. 24, 2014

(87) PCT Pub. No.: WO2012/127482
PCT Pub. Date: Sep. 27, 2012

(65) Prior Publication Data
US 2014/0298302 A1   Oct. 2, 2014

(51) Int. Cl.
*G06F 11/36*   (2006.01)
(52) U.S. Cl.
CPC ...... *G06F 11/3624* (2013.01); *G06F 11/3604* (2013.01); *G06F 11/3664* (2013.01)
(58) Field of Classification Search
CPC ............. G06F 11/3624; G06F 11/3604; G06F 11/3664
See application file for complete search history.

(56) References Cited

U.S. PATENT DOCUMENTS

| | | | |
|---|---|---|---|
| 6,085,029 A | 7/2000 | Kolawa et al. | |
| 2006/0085156 A1 | 4/2006 | Kolawa et al. | |
| 2006/0095427 A1* | 5/2006 | Dickenson | G06F 11/362 |
| 2006/0206885 A1* | 9/2006 | Seidman | G06F 11/073 717/148 |
| 2007/0271418 A1* | 11/2007 | Sridharan et al. | 711/146 |
| 2010/0031238 A1 | 2/2010 | Li et al. | |
| 2010/0115273 A1* | 5/2010 | Chittigala | G06F 9/5016 713/164 |
| 2011/0107297 A1* | 5/2011 | Chandra | G06F 8/433 717/110 |
| 2011/0145650 A1* | 6/2011 | Krauss | G06F 11/3604 714/38.1 |

\* cited by examiner

*Primary Examiner* — Li B Zhen
*Assistant Examiner* — Amir Soltanzadeh
(74) *Attorney, Agent, or Firm* — Klarquist Sparkman, LLP

(57) ABSTRACT

A method and a system have been disclosed for detecting one or more memory leaks in a program. The method includes receiving the program code. After receiving the program, the program is tokenized automatically in a pre-defined format. The predefined format may correspond to a format which is up-loadable to a database. Thereafter, the tokenized program code is analyzed to determine control flows in the program by using a memory leak pattern. The memory leak pattern is an incorrect control flow between the combination of memory allocation and memory de-allocation functions. After analyzing the tokenized program, the memory leaks are identified based on the determined control flows in the program. The memory leaks are identified during the development phase of the program code. Subsequently, the memory leaks are fixed by a programmer.

33 Claims, 8 Drawing Sheets

Static Memory Leak Detector (SMLD) tool
Software Performance Engineering

| Batch Name | Compare with Batch | Select batch |
|---|---|---|
| DemotoCore 0708 – Wed July 8 8:10 ▽ | | ▽ |
| DemotoCore 0708 – Wed July 8 8:10 ▽ | | |
| Test070809- Wed July 9:15 | | |

| S.No | File Name | Function Name | Variable Name |
|---|---|---|---|
| 1 | CMsgDigest.cpp | CMsgDigest::testCMsgDigest | SInBuff |
| 2 | Ctfin_crvImpl.cpp | Ctfin_crvImpl::FnListInit | pList |
| 3 | arseedutils.cxx | EncryptSeed | *Icrypt_Key |
| 4 | bauu9132.cxx | update_cum_amt | x |

Microsoft Excel Worksheet

| File Name | Function Name | Variable Name |
|---|---|---|
| CMsgDigest.cpp | CMsgDigest::testCMsgDigest | SInBuff |
| Ctfin_crvImpl.cpp | Ctfin_crvImpl::FnListInit | pList |
| arseedutils.cxx | EncryptSeed | *Icrypt_Key |
| bauu9132.cxx | update_cum_amt | x |

Static Memory Leak Detector (SMLD) tool
Software Performance Engineering

| Batch Name | | |
|---|---|---|
| DemotoCore 0708 – Wed July 8 8:10 | Compare with Batch | Test070809- Wed July 9:15 |
| DemotoCore 0708 – Wed July 8 8:10 | | |
| All | | |
| Test070809- Wed July 9:15 | | |

800

| File Name | Function Name | Variable Name | Comparison |
|---|---|---|---|
| CMsgDigest.cpp | CMsgDigest::testCMsgDigest | SInBuff | Leak from DemotToCore 0708 – |
| Ctfin_crvImpl.cpp | Ctfin_crvImpl::FnListInit | pList | Leak from Test070809 - Wed |

FIG. 8

METHOD AND SYSTEM FOR DETECTING MEMORY LEAKS IN A PROGRAM

RELATED APPLICATION DATA

This application claims priority to International Patent Application No. PCT/IN2011/000194, filed Mar. 23, 2011, the disclosure of which is hereby incorporated by reference in its entirety.

FIELD OF THE INVENTION

The present invention relates, in general, to the field of memory management. More particularly, the invention relates to a method and a system for detecting memory leaks in a program.

BACKGROUND

Memory is one of the critical resources for any computing system and plays an essential role in performance, scalability, and availability of applications/programs being developed. In scenarios where memory is not handled properly, it might lead to many bugs and major performance issues. Such scenarios may be encountered when an application is using Central Processing Unit (CPU) excessively, when 'OutOfMemory' exception is thrown, and when a process is using too much memory for no evident reason. Thus, the need for memory management arises; accordingly, effective memory management has been an important factor in the field of computing system. The task of managing memory involves allocating memory to programs when requested and de-allocating the memory for reuse when the programs no longer require the allocated memory. However, de-allocation may not always occur.

There exist a number of memory management problems that are common to programs written in various programming languages. Some examples of the memory management problems are dangling pointers, misassignment, memory leaks, and array bound violations. One of the most common forms of memory management problems is memory leak. Memory leak is a type of unconscious memory consumption by a computer program, where the program is unable to release the memory it has acquired. This causes the program to consume memory when no longer needed and this simultaneously affects the available memory for other computer programs. Eventually, slow down of the computing system and crashing of the computer applications can occur.

Over the years, the problem of memory leak has plagued programmers who write programs in different programming languages. Specially, with respect to languages having manual memory management, such as C and C++, writing large programs with minimal memory leaks can be challenging. Programs written in these languages often have a large number of memory leaks that can be difficult to trace.

There exist a number of methods and systems for detecting memory leaks in a program. However, these existing methods and systems focus on detecting the memory leaks manually; thus, a lot of effort and time is required by the programmers. Further, a number of tools are available in the market for detecting the memory leaks, but these tools specially focus on detecting the memory leaks at run-time (i.e., after developing the program). Thus, a lot of rework for modifying the program is required once the memory leaks are detected. Additionally, the above mentioned solutions are not capable of highlighting variables or functions causing the memory leaks.

In view of the foregoing discussion, there is a need for an automated method and a system for detecting memory leaks in a program. An automated approach of detecting the memory leaks saves a lot of effort and time required by programmers. This further enhances the capability of the programmers to detect the memory leaks with ease. Further, there also lies a need to detect the memory leaks at the time of developing a program so that a lot of rework required at later stages is avoided. Moreover, there also exists a need for pinpointing variables or functions causing the memory leaks, thereby helping the programmers to easily track the memory leaks and fix it accordingly.

SUMMARY

The present invention describes a method for detecting one or more memory leaks in a program code. The method includes receiving the program code. The program code may be written in programming languages such as C, C++, C#, Visual Basic (VB), and VB.Net. After receiving the program code, the program code is tokenized automatically in a predefined format. The predefined format may correspond to a format which is up-loadable to a database and may be put use for further analysis. Thereafter, the tokenized program code is analyzed to determine control flows in the program code by using a memory leak pattern. The memory leak pattern is an incorrect control flow between the combination of memory allocation and memory de-allocation functions. After analyzing the tokenized program code, the memory leaks are identified based on the determined control flows in the program code. The memory leaks are identified during the development phase of the program code.

The present invention facilitates a Static Memory Leak Detector (SMLD) tool for detecting memory leaks in a program code. The SMLD tool includes a User Interface (UI) configured for receiving the program code. Further, the SMLD includes a parser configured for tokenizing the program code automatically in a predefined format. The predefined format may correspond to a format which is up-loadable to a database and may be used for analysis. Furthermore, the SMLD includes an analyzer configured for analyzing the tokenized program code to determine control flows in the program code by using a memory leak pattern. The memory leak pattern is an incorrect control flow between the combination of memory allocation and memory de-allocation functions. In addition to the above, the analyzer described above is configured for identifying the memory leaks based on the determined control flows in the program code. The memory leaks are identified during the development phase of the program code.

In addition to the above, the present invention describes a Computer Program Product (CPP) for detecting one or more memory leaks in a program code. The program code may be written in programming languages such as C, C++, C#, Visual Basic (VB), and VB.Net. The CPP includes a program instruction means for receiving the program code. The CPP further includes a program instruction means for tokenizing the program code automatically in a predefined format. The predefined format may correspond to a format which is up-loadable to a database and may be further used for analysis. Further, the CPP includes a program instruction means for analyzing the tokenized program code to determine control flows in the program code by using a memory leak pattern. The memory leak pattern is an incorrect control flow between the combination of memory allocation and memory de-allocation functions. Additionally, the CPP also includes a program instruction means for identifying the memory leaks based on the determined control flows in the program code. The memory leaks are identified during the development phase of the program code.

BRIEF DESCRIPTION OF THE DRAWINGS

Various embodiments of the invention will hereinafter be described in conjunction with the appended drawings provided to illustrate, and not to limit, the invention, wherein like designations denote like elements, and in which:

FIG. 5 discloses an exemplary UI of SMLD tool depicting a leak report, in accordance with an embodiment of the present invention;

FIG. 7 is an exemplary depiction of Microsoft Excel Spreadsheet containing leak report details, in accordance with an embodiment of the present invention; and FIG. 8 represents an exemplary UI illustrating comparison of batches, in accordance with an embodiment of the present invention.

DETAILED DESCRIPTION

The present invention discloses a unique approach and a tool for detecting memory leaks statically in software programs. Specifically, the invention is directed toward memory leak detection for scenarios where memory allocated to a function is not getting de-allocated in the function. The invention also detects memory leaks when memory gets overwritten in a function. The approach of detecting the memory leaks statically helps the programmers to avoid a lot of rework required at later stages, such as, unit testing, system testing and the like. Further, the present invention facilitates the detection of memory leaks in programs written in various programming languages such as, but are not limited to, C, C++, VC++, C# (ASP.Net), Visual Basic (VB), VB.Net, Java, Visual FoxPro, JavaScript, Pearl, Hypertext Preprocessor (PHP), Smalltalk, Pascal, Common Business-Oriented Language (Cobol), and Formula Translator (Fortran). Once the memory leaks are detected, they are fixed by the programmers. The programs as described above may form a part of various projects such as, but are not limited to, software development projects, software re-engineering projects, documentation projects, and software maintenance projects.

Figure 1:
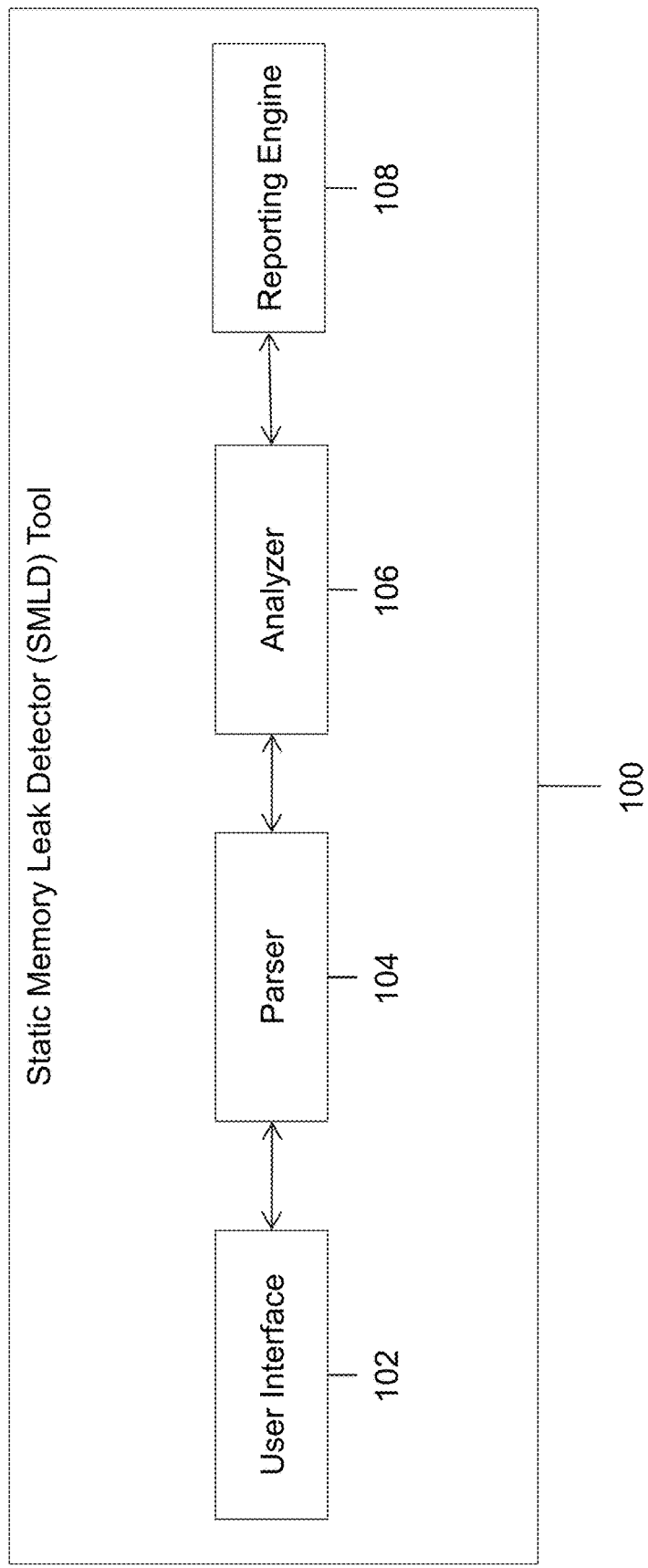
FIG. 1 illustrates an environment in which various embodiments of the invention may be practiced.

FIG. 1 illustrates an environment in which various embodiments of the invention may be practiced. To describe the system elements illustrated in FIG. 1, references will be made to FIG. 2, although it will be apparent to those skilled in the art that the steps executed by the system elements can be applicable to any other embodiment of the present invention.

Environment as depicted in FIG. 1 includes a Static Memory Leak Detector (SMLD) tool 100. SMLD tool 100 detects memory leaks in programs written in various programming languages as described above. SMLD tool 100 may run on a computing device. Further, SMLD tool 100 is capable to work with various Operating System (OS) platforms, but are not limited to, Microsoft Windows, Linux, Unix, Sun Solaris, Hewlett Packard UniX (HP-Unix®), and Advanced Interactive eXecutive (IBM AIX).

As illustrated in FIG. 1, SMLD tool 100 includes a user interface 102, a parser 104, an analyzer 106, and a reporting engine 108. User interface 102 is configured for receiving a program code as input by a programmer. The program code may be written in one of the programming languages as mentioned above. Once the program code is written, it can be saved in a file called a source file. In accordance with an embodiment of the present invention, a programmer provides a source file as an input to user interface 102. The source file contains the program code and references to one or more source files.

After receiving the program code, parser 104 tokenizes the program code automatically in a predefined format. The predefined format may correspond to a format which is up-loadable to a database and may be used for analysis by analyzer 106. Pursuant to this, analyzer 106 analyzes the program code for determining control flows in the program code by using a memory leak pattern. The memory leak pattern is an incorrect control flow between the combination of memory allocation and memory de-allocation functions causing the memory leaks. The control flows in the program code refer to the correspondence between memory allocation and memory de-allocation functions. Further, the memory leak pattern is pre-configured in SMLD tool 100.

In accordance with an embodiment of the present invention, the process of determining the control flows in the program code has been described in detail. As depicted in FIG. 1, SMLD tool 100 identifies memory leaks, specifically in one or more conditional logics that are defined in a function of a program code. The conditional logics may include, but are not limited to, 'if-else' block, 'for' block, 'while' block, 'switch' block, and 'case' block. Initially, the program code is parsed by parser 104 to identify conditional logics in the program code. The conditional logics are identified at a function level by using a stacking mechanism. Thereafter, the identified conditional logics are stored in the database. Analyzer 106 then analyzes the stored conditional logics to check whether the conditional logics, such as 'if-else' block have memory allocation functions on the same variable. Further, these memory allocation functions are considered once while identifying the memory leaks in the program code.

Additionally, an exemplary program code has been illustrated below to understand the process described above:

```
If (condition)
{ .....
X = malloc (arguments);
......
} else
{
.....
X= malloc (arguments);
....
}
```

As illustrated in the exemplary program code, the program code contains conditional logic such as 'if-else' block having memory allocation functions. These memory allocation functions have been defined on a variable 'x'. Further, when parsing is being performed by parser 104, these conditional logics are identified. After the parsing is being performed, analyzer 106 checks whether the memory allocation functions defined in 'if' block on a variable 'x' are also defined in the 'else' block. Based on the check performed, analyzer 106 identifies the memory leaks in the program code.

In accordance with a preferred embodiment of the invention, the programmer may add new memory leak patterns to SMLD tool 100. Further, the programmer may also delete or modify the existing the memory leak patterns that are configured in SMLD tool 100.

In accordance with an embodiment of the present invention, the memory leak pattern is predefined. The predefined memory leak pattern may include standard/in-built library functions of the programming language in which the program code is written. Further, the predefined memory leak pattern may include external library functions relating to the programming language in which the program code is written.

In accordance with another embodiment of the present invention, the memory leak pattern may be defined by the programmer.

As described above, analyzer 106 is further configured for identifying memory leaks based on the determined control flows in the program code. The memory leaks are identified during the development phase of the program code. Thus, a lot of rework required at later stages such as system testing is avoided. Once the memory leaks are identified, reporting engine 108 generates a report (leak report) containing details associated with the memory leaks. The details of the leak report may include, but are not limited to, file name, function name, variable name, project name, date, and time. The leak report is generated in such a format so that the programmer can easily understand and analyze the memory leaks. Further, the leak report is viewable by the programmer using user interface 102. In an embodiment of the present invention, the leak report is stored in a database.

After generating the leak report, the programmer analyzes the memory leaks contained in it and accordingly, the programmer fixes the memory leaks. If the memory leaks are fixed by the programmer, SMLD tool 100 does not report those memory leaks in the leak report. However, if the memory leaks are not fixed by the programmer, SMLD tool 100 keeps on reporting the memory leaks in the leak report until the memory leaks are fixed.

In accordance with an embodiment of the present invention, SMLD tool 100 facilitates such a provision to the programmer where the programmer can decide whether the memory leaks can be ignored. If the programmer decides any of the memory leaks to be ignored, those memory leaks are not reported in the leak report.

In an embodiment of the invention, SMLD tool 100 is scheduled to detect the memory leaks automatically over a predefined period of time. The predefined period of time may include, but is not limited to, every day of the week, once in a week, or once in a month.

Figure 2:
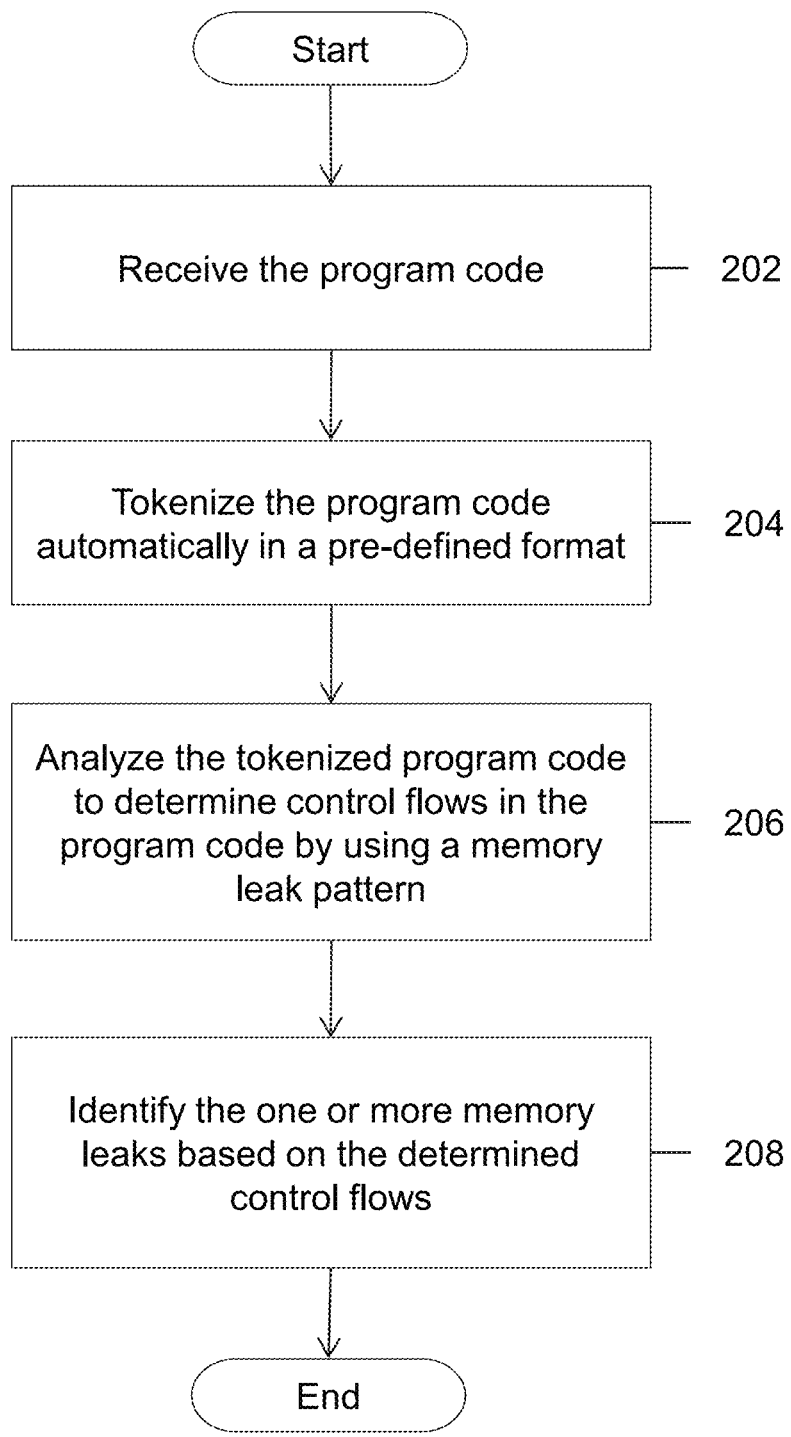
FIG. 2 is a flow diagram for detecting memory leaks in a program, in accordance with an embodiment of the invention.

FIG. 2 is a flow diagram for detecting memory leaks in a program, in accordance with an embodiment of the invention. To describe the method illustrated in FIG. 2, references will be made to FIG. 1, although it will be apparent to those skilled in the art that the method can be applicable to any other embodiment of the present invention.

At 202, a program code as input by a programmer is received. The program code may be written in various programming languages. Examples of various programming languages may include, but are not limited to, C, C++, VC++, C# (ASP.Net), Visual Basic (VB), VB.Net, Java, Visual FoxPro, JavaScript, Pearl, Hypertext Preprocessor (PHP), Smalltalk, Pascal, Common Business-Oriented Language (Cobol), and Formula Translator (Fortran). In accordance with an embodiment of the present invention, a programmer may input a source file containing the program code through a user interface, such as user interface 102.

After receiving the program code, the program code is tokenized automatically in a predefined format. The predefined format may correspond to a format which is uploadable to a database and may be further used for analysis. Accordingly, the tokenized program code is analyzed to determined control flows in the program code by using a memory leak pattern. The memory leak pattern is an incorrect control flow between the combination of memory allocation and memory de-allocation functions. The process of determining the control flows further includes matching the control flows of functions and pointer variables against the memory leak pattern configured in a SMLD tool, such as SMLD tool 100. For example, to determine the control flows, it is checked whether all variables allocated in a function are de-allocated in the same function or not. In another example, to determine the control flows, all possible combinations of a variable with one or more variables are considered.

To further elaborate, an example has been described below.

```
Program A
{char *a;
Do {
a= (char *) malloc (len);
*a=book;
*b=*a;
*c=*b ;}
```

This example illustrates that a variable defined in a program is copied to a second variable, and the second variable is further copied to a third variable. Accordingly, all combinations of a variable "a" with variables "b" and "c" are considered.

In an exemplary embodiment of the present invention, a memory leak pattern is described. To create the memory leak pattern, a transaction memory pointer is created. Using the transaction memory pointer, two functions are defined such as (Transaction *) AllocateTranMem ( ) and DeallocateTranMem (Transaction *ptr). Further, (Transaction *) AllocateTranMem ( ) function allocates memory for the transaction memory pointer and returns the reference to that memory pointer. However, de-allocateTranMem (Transaction *ptr) function de-allocates memory for the transaction memory pointer as passed.

The memory leak pattern is configured in the SMLD tool. In accordance with an embodiment of the present invention, the memory leak pattern is predefined. The predefined memory leak pattern may include standard/in-built library functions of the programming language in which the program code is written. Further, the predefined memory leak pattern may include external library functions of the programming language in which the program code is written.

In accordance with another embodiment of the present invention, the memory leak pattern may be defined by a programmer.

Based on the determined control flows, the memory leaks in the program code are identified. The determined control flows may include incorrect flow of memory allocation and de-allocation functions. In an example, it can be considered that a programmer allocates a memory to a pointer variable. However, the programmer may have missed to deallocate the memory for the pointer variable. Thus, this incorrect flow of memory allocation and memory de-allocation functions are reported as potential memory leaks. The memory leaks are identified during the development phase of the program code. Thus, the programmer does not have to wait till the time of the completion of the program code.

Once the memory leaks are identified, the memory leaks are updated in a database. Subsequently, a leak report containing details associated with the memory leaks is generated. The details of the leak report may include, but are not limited to, file name, a function name, a variable name, a project name, date, and time. Also, the leak report is generated with a unique batch name/project name. The leak report is generated in a format which is easily understandable by the programmer. Further, the leak report can be viewed by a programmer using the user interface. Furthermore, the leak report is stored in a database.

After generating the leak report, highlighting of at least one of the functions, variables, and source file in the leak report are performed. This helps the programmer to track where the memory leaks are required to be fixed. The fixing of memory leaks is limited to a particular function only.

In accordance with an embodiment of the present invention, the leak report is exported in a document of a pre-defined format. The document may be, but is not limited to, Microsoft Excel, Microsoft Word, and Microsoft Power Point.

The method described above further includes implementing a configuration management scheme. The configuration management scheme is implemented to check whether the memory leaks are fixed. Moreover, the method includes comparing two or more leak reports. The two or more leak reports may be compared when the original program code is modified. In an example, it can be considered that a leak report, such as leak report 1 is generated corresponding to original program code. Later, when the original program code is modified by the programmer, subsequently, a separate leak report such as leak report 2 is generated for the modified code. Accordingly, the leak report 1 and the leak report 2 can be compared to check whether the leaks reported in the leak report 1 are forming a part of the leak report 2.

In addition to this, the method includes reporting user interface flow between a back-end system and a front-end system. The user interface flow diagram has been described in detail in conjunction with FIG. 3.

In accordance with an embodiment of the present invention, the method described above is scheduled to detect the memory leaks automatically over a predefined time period. The predefined time period may be everyday of the week, once in a week, or once in a month.

To make the person ordinary skilled in the art understand the invention, an example has been described. According to this example, it can be assumed that a source file DemotoCore 0708 is input by the programmer. The source file contains the program code as shown below.

```
Program A {
Ifdef AA_Test
Int CMsgDigest : : CMsgDigest ( )
Char sinfile [1024], *sInbuff, *pOutbuff=0;
Unsigned int, iOption, iInLen, iOutLen=0;
```

-continued

```
Do
{
Printf("\n\n***** CMsgDigest Test Program****\n);
Switch (iOption)
{
  Case 1:
{
Printf("Input File:");
Scanf("%s", sInfile);
Fseek(fpIn, 0, Seek_End);
intLen =Ftell (fpIn);
sInbuff = (char *) malloc(len);
if (SInBuff == Null)
{
If (fpIn) fclose (fpIn);
Printf( "error Allocating Memory\n");
Break;
}}}}}
```

The source file as input by the programmer is received by the user interface. After receiving the source file, the parser parses the program code to identify various functions and variables defined in the program code. Thereafter, the analyzer analyzes the program code to determine control flows as described above. The analysis of the program code includes, identification of all pointer variables in the program code, such as *sInBuff. The analyzer then determines that the memory allocated to this pointer variable has never been de-allocated within the same function. This shows an incorrect flow between memory allocation and memory de-allocation functions. Accordingly, the analyzer reports this as a memory leak and highlights this variable as a cause for the memory leak. Subsequently, the reporting engine generates a leak report illustrating details such as file name, function name, and variable. In light of the example above, the details of the leak report may include DemotoCore 0708, Do, *SInBuff, respectively.

Figure 3:
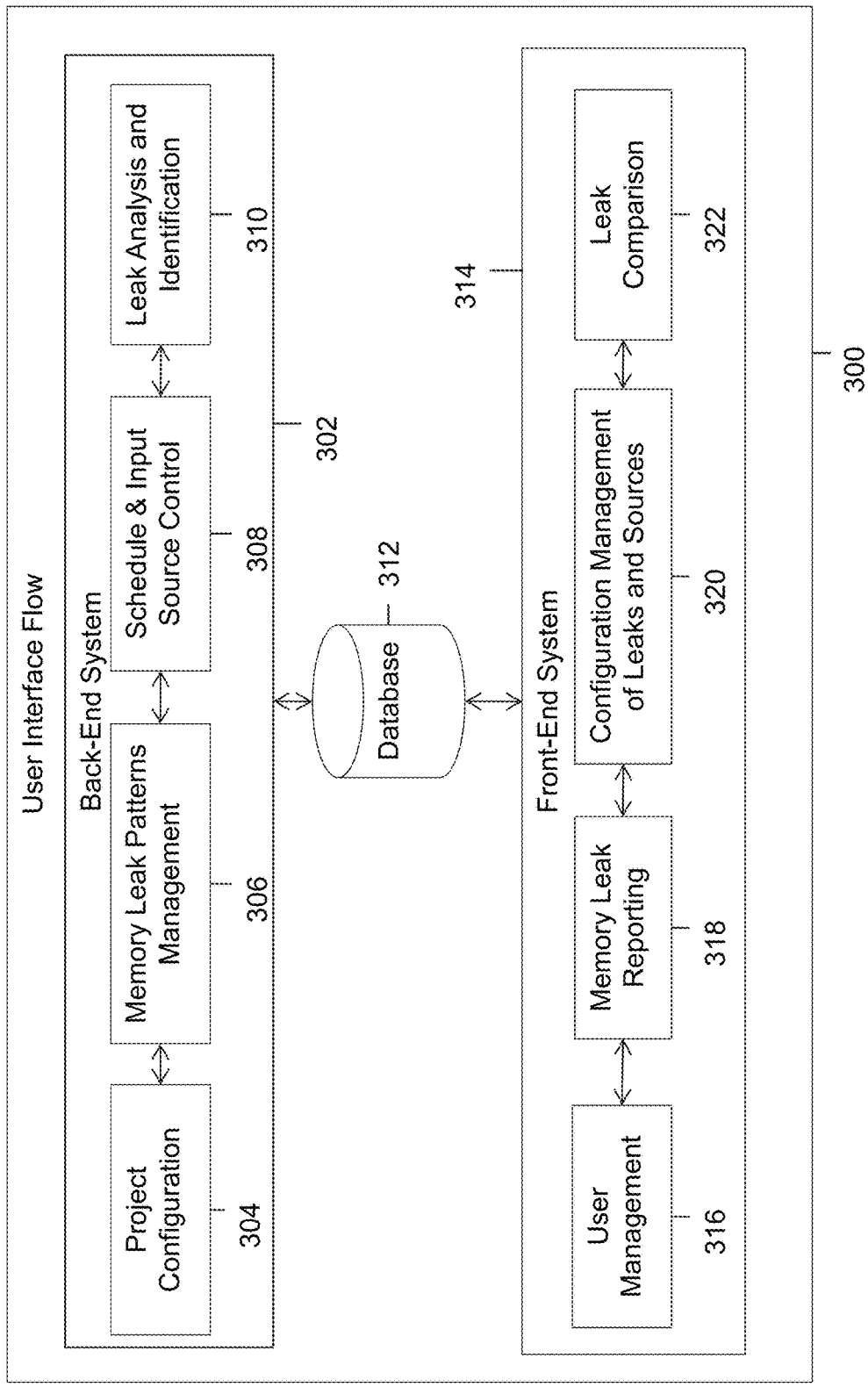
FIG. 3 depicts a user interface flow diagram, in accordance with an embodiment of the present invention.

FIG. 3 depicts a user interface flow diagram, in accordance with an embodiment of the present invention.

User interface flow diagram 300 includes a back-end system 302, a front-end system 314, and a database 312. Front-end system 314 is also referred to as an online reporting engine. Further, back-end system 302 includes a project configuration module 304, memory leaks pattern management module 306, schedule and input source control module 308, and leak analysis and identification module 310. Further, front-end system 314 includes a user management module 316, a memory leak reporting module 318, configuration management of leaks and sources module 320, and a leak comparison module 322.

User interface flow diagram 300 describes the flow between back-end system 302 and front-end system 314. Overall, the flow diagram describes how the user/programmer provides an input in terms of a source file which is processed by back-end system 302 to generate a leak report. The leak report can be viewed by a programmer through front-end system 314.

As depicted in FIG. 3, project configuration module 304 enables the programmer to provide an input, such as a source file containing the program code. The source file may contain references to one or more source files. It is a one-time activity performed by the programmer. Memory leaks pattern management module 306 allows the programmer to perform one or more actions related to the memory leak pattern. The actions may include, but are not limited to, addition, deletion, and modification of memory leak pattern.

Schedule and input source control module 308 enables the programmer to run a tool, such as SMDL tool 100, over a predefined time period. The predefined time period may be, but is not limited to, once in a day, once in a week, or once in a month. Also, schedule and input source control module 308 enables the programmer to have a control on the input source files. Further, schedule and input control module 308 assists in automating the process of detecting memory leaks, and thus any kind of manual intervention is not required. The process can be automated by scheduling SMLD tool 100 to run at regular intervals of time. SMLD tool 100 can be scheduled by providing/configuring various options in SMLD tool 100. For example, SMLD tool 100 can be scheduled to run for specific set of files at a pre-specified time, a specific day, or a specific month. Thereafter, leak analysis and identification module 310 analyzes the source file using the memory leak pattern and identifies the leaks in the source file. The memory leak pattern is stored in database 312. Further, this module also facilitates manual execution of the SMLD tool.

User management module 316 defines various levels of users, such as administrator, regular users for using SMLD tool 100. For example, admin users are allowed to configure/run the SMLD tool, whereas regular users are not allowed to configure the SMLD tool. Memory leak reporting module 318 generates a leak report containing all the memory leaks present in the source file. The leak report is viewable by the programmer using the user interface. Further, configuration management of leaks and sources module 320 describes that memory leaks are stored in database 312 with details such as batch name/project name, date, and time. These details help the programmer to know what date and time the execution of the source file is performed. Moreover, leak comparison module 322 facilitates comparison of two or more leak reports.

In addition to this, database 312 as depicted in FIG. 3 stores information associated with a particular project, such as source files, memory leaks, and memory leak patterns. Database 312 interacts with back-end system 302 and front-end system 314.

Figure 4:
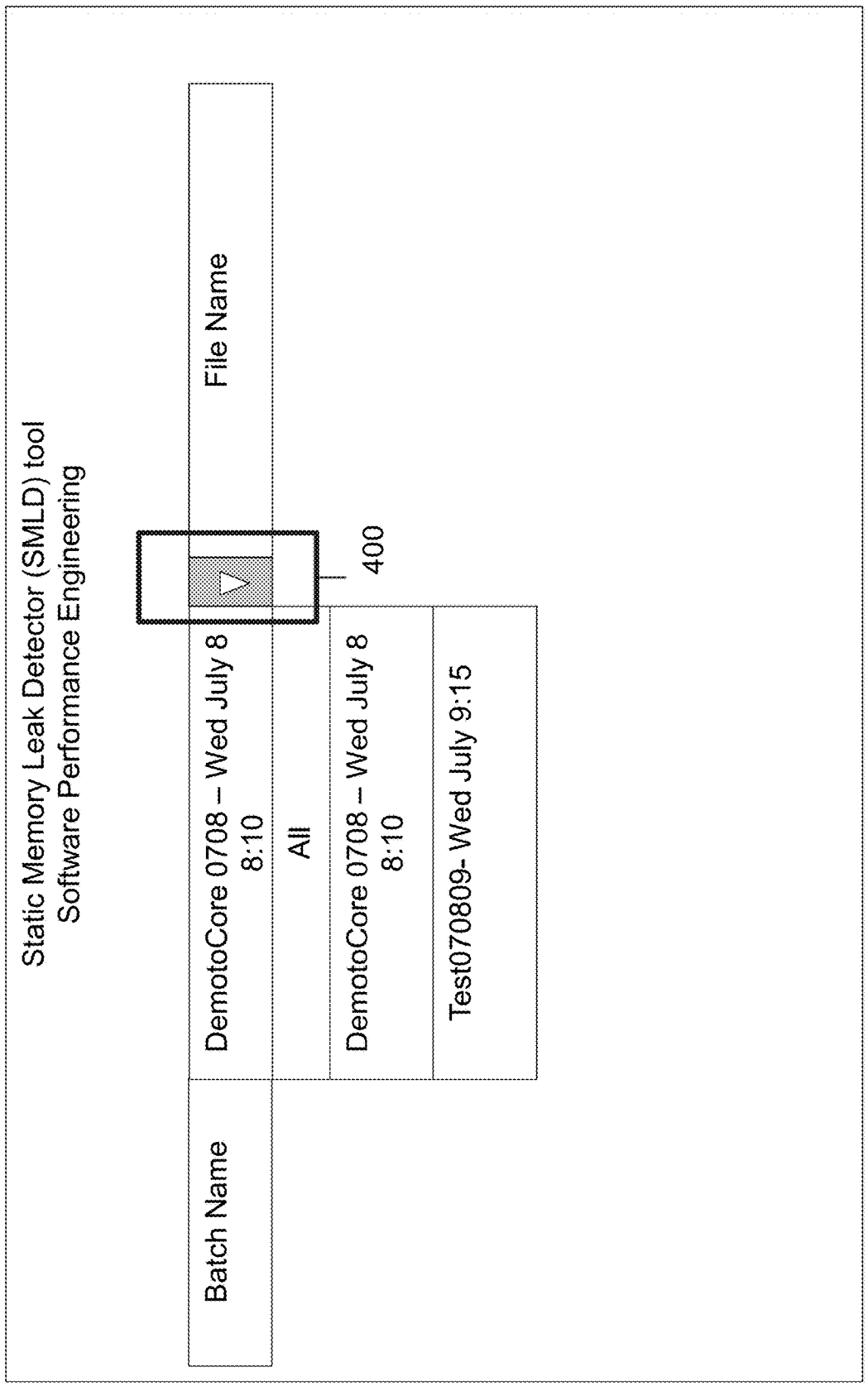
FIG. 4 is an exemplary User Interface (UI) of SMLD tool depicting selection of a batch, in accordance with an embodiment of the present invention.
Figure 6:
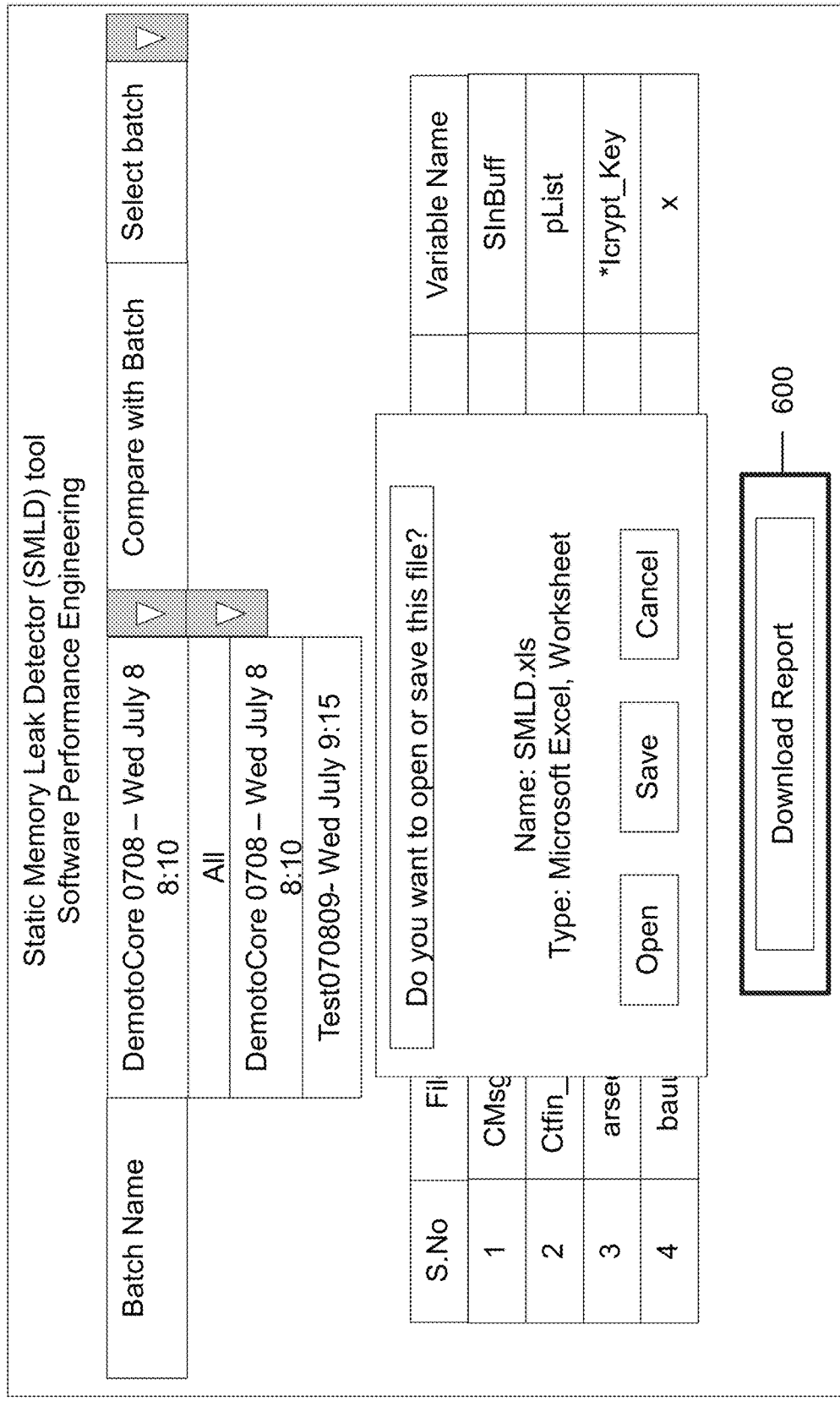
FIG. 6 represents an exemplary UI of SMLD tool depicting downloading of a leak report, in accordance with an embodiment of the present invention.

The invention has been explained with the help of an example. In accordance with the exemplary embodiment, it can be assumed that a programmer inputs a source file for which he/she wishes to identify memory leaks. The source file is input by the programmer using a drop down menu 400 as shown in FIG. 4. After inputting the source file, the parser parses the source file and tokenizes the program code contained in it. Thereafter, the parser uploads the tokenized code to the database. The analyzer analyzes the tokenized code to identify the memory leaks. Once all the memory leaks in the source file are identified, a leak report 500 as shown in FIG. 5 is generated. The leak report as depicted in FIG. 5 illustrates the information such as file name, function name, and variable name. This information helps the programmer to track the precise location of the memory leak and fix it accordingly. Further, the memory leak report as generated can be downloaded by clicking on "Download Report" button 600 as depicted in FIG. 6. Moreover, the downloaded report can be exported to an MS Excel sheet 700 as shown in FIG. 7.

In addition to the above, two batches can be compared to identify memory leaks. The batches are selected by using drop down menus 800 as shown in FIG. 8. The comparison of the batches/projects is illustrated as shown in FIG. 8.

The method and the system described above have numerous advantages. The present invention provides an automated approach for detecting memory leaks in a program code. The process of automatic determination of the memory leaks saves a lot of time and effort required by the programmer. This enhances the capability of programmers to detect the memory leaks. Further, the present invention facilitates a unique approach of detecting the memory leaks at the time of development of a program code so that a lot of rework is avoided at later stages. Moreover, the present invention pinpoints variables or functions causing the memory leaks. Thus, it becomes easier for programmers to track the memory leaks and fix them accordingly. Moreover, the present invention facilitates a user interface enabling the programmers to view memory leak reports at anytime in future. In addition to this, the application developers are not required to have expertise for using/running the tool. An expertise may only be required for configuring the tool.

The method and SMLD tool (or system) for detecting the memory leaks in a program, or any of its components, as described in the present invention, may be embodied in the form of a computer system. Typical examples of a computer system include a general-purpose computer, a programmed microprocessor, a micro-controller, a peripheral integrated circuit element, and other devices or arrangements of devices capable of implementing the steps that constitute the method for the present invention.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can be a hard disk drive or a removable storage drive such as a floppy disk drive and an optical disk drive. The storage device can be other similar means for loading computer programs or other instructions into the computer system.

The computer system executes a set of instructions that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer to be downloaded at or prior to the time of use. Examples of such external computer program products are computer readable storage mediums such as CD-ROMS, Flash chips, and floppy disks.

The set of instructions may include various commands that instruct the processing machine to perform specific tasks such as the steps that constitute the method for the present invention. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions (program instruction means) can be embedded in a computer program product for use with a computer; the program product comprising a computer-usable medium with a computer readable program code embodied therein. The processing of input data by the processing machine may be in response to users' commands, results of previous processing, or a request made by another processing machine.

The modules described herein may include processors and program instructions that are used to implement the functions of the modules described herein. Some or all the functions can be implemented by a state machine that has no stored program instructions, or in one or more Application-specific Integrated Circuits (ASICs), in which each function or some combinations of some of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

What is claimed is:

1. A method executed by one or more computing devices for statically detecting one or more memory leaks in program code, the method comprising:
   receiving, by at least one of the one or more computing devices, the program code, wherein the program code is written in a programming language;
   tokenizing, by at least one of the one or more computing devices, the program code to generate tokenized program code by identifying conditional logics in the program code at a function level via a stacking mechanism;
   uploading, by at least one of the one or more computing devices, the tokenized program code to a first database;
   creating, by at least one of the one or more computing devices, one or more memory leak patterns corresponding to the programming language of the program code via a transaction memory pointer, wherein the one or more memory leak patterns comprises a first sequence of control flow elements, the control flow elements comprising a first combination of memory allocation and memory de-allocation functions known to cause a memory leak;
   uploading, by at least one of the one or more computing devices, the one or more memory leak patterns to a second database, wherein the second database can be the first database;
   analyzing, by at least one of the one or more computing devices, the tokenized program code stored in the first database to determine one or more control flows in the program code by identifying memory allocation and de-allocation functions for variables in the conditional logics, including all possible combinations of a given variable with other variables available within the applicable conditional logic, and matching control flows of functions and pointer variables in the program code against the one or more memory leak patterns, wherein the one or more determined control flows comprise a second sequence of control flow elements, the control flow elements comprising a second combination of memory allocation and memory de-allocation functions in the program code;
   determining, by at least one of the one or more computing devices, whether the one or more determined control flows match any of the one or more memory leak patterns by comparing the second combination in the one or more determined control flows to the first combination in the one or more memory leak patterns; and
   identifying, by at least one of the one or more computing devices, one or more potential memory leaks if the second combination matches the first combination.

2. The method according to claim 1, further comprising updating a third database with the identified one or more potential memory leaks and detail information for locating the one or more potential memory leaks in the program code, wherein the third database can be the same as the first or second databases.

3. The method according to claim 1, further comprising generating a report of the identified one or more potential memory leaks including detail information for locating the one or more potential memory leaks in the program code.

4. The method according to claim 3, further comprising highlighting at least one detail from the detail information in the report, wherein the detail information comprises at least one of a variable, a function, and a source file, wherein the variable and the function are defined in the program code.

5. The method according to claim 3, further comprising comparing the report with a second report generated after the program code is modified, wherein the second report includes details associated with one or more second potential memory leaks in the modified program code.

6. The method of claim 1, wherein the one or more potential memory leaks are identified automatically over a predefined time period.

7. The method according to claim 1, wherein at least one of the one or more memory leak patterns is created by a user.

8. A system for statically detecting one or more potential memory leaks in program code, the system comprising:
   one or more processors; and
   one or more memories operatively coupled to at least one of the one or more processors and having instructions stored thereon that, when executed by at least one of the one or more processors, cause at least one of the one or more processors to:
      receive the program code, wherein the program code is written in a programming language;
      tokenize the program code to generate tokenized program code by identifying conditional logics in the program code;
      create one or more memory leak patterns, wherein the one or more memory leak patterns corresponding to the programming language of the program code, wherein the one or more memory leak patterns comprises a first sequence of control flow elements, the control flow elements comprising a first combination of memory allocation and memory de-allocation functions known to cause a memory leak;
      analyze the tokenized program code stored in the first database to determine one or more control flows in the tokenized program code by identifying memory allocation and de-allocation functions for variables in the conditional logics and matching control flows of functions and pointer variables in the program code against the one or more memory leak patterns, wherein the one or more determined control flows comprise a second sequence of control flow elements, the control flow elements comprising a second combination of memory allocation and memory de-allocation functions in the program code;
      determine whether the one or more determined control flows match any of the one or more memory leak patterns by comparing the second combination in the one or more determined control flows to the first combination in the one or more memory leak patterns; and
      identify one or more potential memory leaks if the second combination matches the first combination.

9. The system of claim 8, wherein at least one of the one or more memories has further instructions stored thereon that, when executed by at least one of the one or more processors, cause at least one of the one or more processors to:

store the identified one or more potential memory leaks and detail information for locating the one or more potential memory leaks in the program code.

10. The system of claim 8, wherein at least one of the one or more memories has further instructions stored thereon that, when executed by at least one of the one or more processors, cause at least one of the one or more processors to:

generate a report of the identified one or more potential memory leaks including detail information for locating the one or more potential memory leaks in the program code.

11. The system of claim 10, wherein at least one of the one or more memories has further instructions stored thereon that, when executed by at least one of the one or more processors, cause at least one of the one or more processors to:

highlight at least one detail from the detail information in the report, wherein the detail information comprises at least one of a variable, a function, and a source file, wherein the variable and the function are defined in the program code.

12. The system of claim 10, wherein at least one of the one or more memories has further instructions stored thereon that, when executed by at least one of the one or more processors, cause at least one of the one or more processors to:

compare the report with a second report generated after the program code is modified, wherein the second report includes details associated with one or more second potential memory leaks in the modified program code.

13. The system of claim 8, wherein the one or more potential memory leaks are identified automatically over a predefined time period.

14. The system of claim 8, wherein at least one of the one or more memory leak patterns is created by a user.

15. The system of claim 8, wherein the one or more control flows in the program code are determined by matching control flows of functions and pointer variables in the tokenized program code against the one or more memory leak patterns.

16. At least one non-transitory computer-readable medium storing computer-readable instructions that, when executed by one or more computing devices, cause at least one of the one or more computing devices to:

receive program code, wherein the program code is written in a programming language;

receive a new memory leak pattern corresponding to the programming language of the program code from a user, wherein the new memory leak pattern comprises a first sequence of control flow elements, the control flow elements comprising a first combination of memory allocation and memory de-allocation functions known to cause a memory leak;

store the new memory leak pattern;

tokenize the program code to generate tokenized program code by identifying conditional logics in the program code;

analyze the tokenized program code to determine one or more control flows in the tokenized program code by identifying memory allocation and de-allocation functions for variables in the conditional logics and matching control flows of functions and pointer variables in the program code against the one or more memory leak patterns, wherein the one or more determined control flows comprise a second sequence of control flow elements, the control flow elements comprising a second combination of memory allocation and memory de-allocation functions in the tokenized program code;

determine whether the one or more determined control flows match any of the one or more memory leak patterns by comparing the second combination in the one or more determined control flows to the first combination in the one or more memory leak patterns; and identify one or more potential memory leaks if the second combination matches the first combination.

17. The at least one non-transitory computer-readable medium of claim 16, further storing computer-readable instructions that, when executed by at least one of the one or more computing devices, cause at least one of the one or more computing devices to:

store the identified one or more potential memory leaks and detail information for locating the one or more potential memory leaks in the program code.

18. The at least one non-transitory computer-readable medium of claim 16, further storing computer-readable instructions that, when executed by at least one of the one or more computing devices, cause at least one of the one or more computing devices to:

generate a report of the identified one or more potential memory leaks including detail information for locating the one or more potential memory leaks in the program code.

19. The at least one non-transitory computer-readable medium of claim 18, further storing computer-readable instructions that, when executed by at least one of the one or more computing devices, cause at least one of the one or more computing devices to:

highlight at least one detail from the detail information in the report, wherein the detail information comprises at least one of a variable, a function, and a source file, wherein the variable and the function are defined in the program code.

20. The at least one non-transitory computer-readable medium of claim 18, further storing computer-readable instructions that, when executed by at least one of the one or more computing devices, cause at least one of the one or more computing devices to:

compare the report with a second report generated after the program code is modified, wherein the second report includes details associated with one or more second potential memory leaks in the modified program code.

21. The at least one non-transitory computer-readable medium of claim 16, wherein the one or more potential memory leaks are identified automatically over a predefined time period.

22. The at least one non-transitory computer-readable medium of claim 16, wherein the one or more control flows in the program code are determined by matching control flows of functions and pointer variables in the tokenized program code against the one or more memory leak patterns.

23. The method according to claim 1, further comprising:

receiving an indication that a given potential memory leak can be ignored; and responsive to the indication that the given potential memory leak can be ignored, omitting the given potential memory leak from a leak report.

24. The method according to claim 1, wherein at least one of the one or more memory leak patterns includes standard library functions of the corresponding programming language of the program code.

25. The method according to claim 1, wherein at least one of the one or more memory leak patterns includes external library functions of the corresponding programming language of the program code.

26. The system of claim 8, wherein at least one of the one or more memory leak patterns is created via a transaction memory pointer.

27. The system of claim 8, wherein at least one of the one or more memory leak patterns corresponds to a programming language of the program code.

28. The system of claim 27, wherein the at least one of the one or more memory leak patterns includes standard library functions of the corresponding programming language of the program code.

29. The system of claim 27, wherein the at least one of the one or more memory leak patterns includes external library functions of the corresponding programming language of the program code.

30. The at least one non-transitory computer-readable medium of claim 16, wherein the new memory leak pattern is created via a transaction memory pointer.

31. The at least one non-transitory computer-readable medium of claim 16, wherein the new memory leak pattern corresponds to a programming language of the program code.

32. The at least one non-transitory computer-readable medium of claim 31, wherein the new memory leak pattern includes standard library functions of the corresponding programming language of the program code.

33. The at least one non-transitory computer-readable medium of claim 31, wherein the new memory leak pattern includes external library functions of the corresponding programming language of the program code.

\* \* \* \* \*